(12) United States Patent
Hollander

(10) Patent No.: US 6,494,306 B1
(45) Date of Patent: Dec. 17, 2002

(54) OUT-PROCESSING FACILITY FOR INDIVIDUAL GOODS

(75) Inventor: Rudolf Hollander, Vorden (NL)

(73) Assignee: Dynamic Systems Engineering B.V. (NL)

( * ) Notice: Subject to any disclaimer, the term of this patent is extended or adjusted under 35 U.S.C. 154(b) by 0 days.

(21) Appl. No.: 09/889,660

(22) PCT Filed: Nov. 17, 1999

(86) PCT No.: PCT/EP99/08823
§ 371 (c)(1),
(2), (4) Date: Jul. 17, 2001

(87) PCT Pub. No.: WO01/36301
PCT Pub. Date: May 25, 2001

(51) Int. Cl.⁷ .............................................. B65G 47/10
(52) U.S. Cl. .................. 198/349.5; 193/35 R; 198/790
(58) Field of Search ................. 198/790, 620, 198/623, 729, 349.5; 193/35 R; 414/26, 132, 444–457

(56) References Cited

U.S. PATENT DOCUMENTS

| | | | | |
|---|---|---|---|---|
| 2,227,778 A | * | 1/1941 | Fischbach et al. | 214/11 |
| 2,328,317 A | * | 8/1943 | Wentworth | 214/11 |
| 2,735,539 A | * | 2/1956 | Snyder | 198/209 |
| 2,891,654 A | * | 6/1959 | Kaplan et al. | 198/19 |
| 3,933,237 A | | 1/1976 | Rotterman | |
| 4,707,250 A | * | 11/1987 | HIppenmeyer | 209/548 |
| 4,835,702 A | | 5/1989 | Tanaka | |
| 4,915,566 A | | 4/1990 | van Elten | |
| 5,040,669 A | | 8/1991 | Blöcker | |
| 5,755,316 A | * | 5/1998 | Reist | 198/349.6 |
| 5,842,555 A | * | 12/1998 | Gannon et al. | 198/358 |
| 5,979,635 A | * | 11/1999 | Calhoun | 198/456 |

FOREIGN PATENT DOCUMENTS

| | | |
|---|---|---|
| CN | 432 366 A | 9/1967 |
| DE | 295 19 805 U1 | 3/1996 |
| EP | 0 803 453 A2 | 10/1997 |

* cited by examiner

Primary Examiner—Donald P. Walsh
Assistant Examiner—Rashmi Sharma
(74) Attorney, Agent, or Firm—R W Becker & Associates; R W Becker

(57) ABSTRACT

Proposed is an out-processing facility for individual goods comprising a storage area (1) with a plurality of storage passages (7) for items to be out-processed extending parallel to one another therein, whereby only items of the same type are located in each passage (7), furthermore comprising a loading area (2) at one end of the storage passages (7) with means for in-loading new items into the storage passages (7) provided therefore, and furthermore comprising an out-processing area (3) at the other end of the storage passages (7) with removal devices (4) for the computer-controlled transfer of individual items out of the storage passages (7) onto downstream conveyor devices. An out-processing facility is to be provided with which high turn-around rates can be achieved and which is also suitable for the simultaneous processing of goods that are very different in terms of weight and size. Every passage (7) comprises one roller conveyor (8), the rollers or cylinders of which can be rotated via a common drive means (16), whereby each passage (7) i provided with a discrete removal apparatus (4) that is actuatable independent of the other removal apparatus. Drive means (16) for the roller conveyor is preferably a drive belt on which active segments alternate with passive, i.e. non-powered, segments.

19 Claims, 6 Drawing Sheets

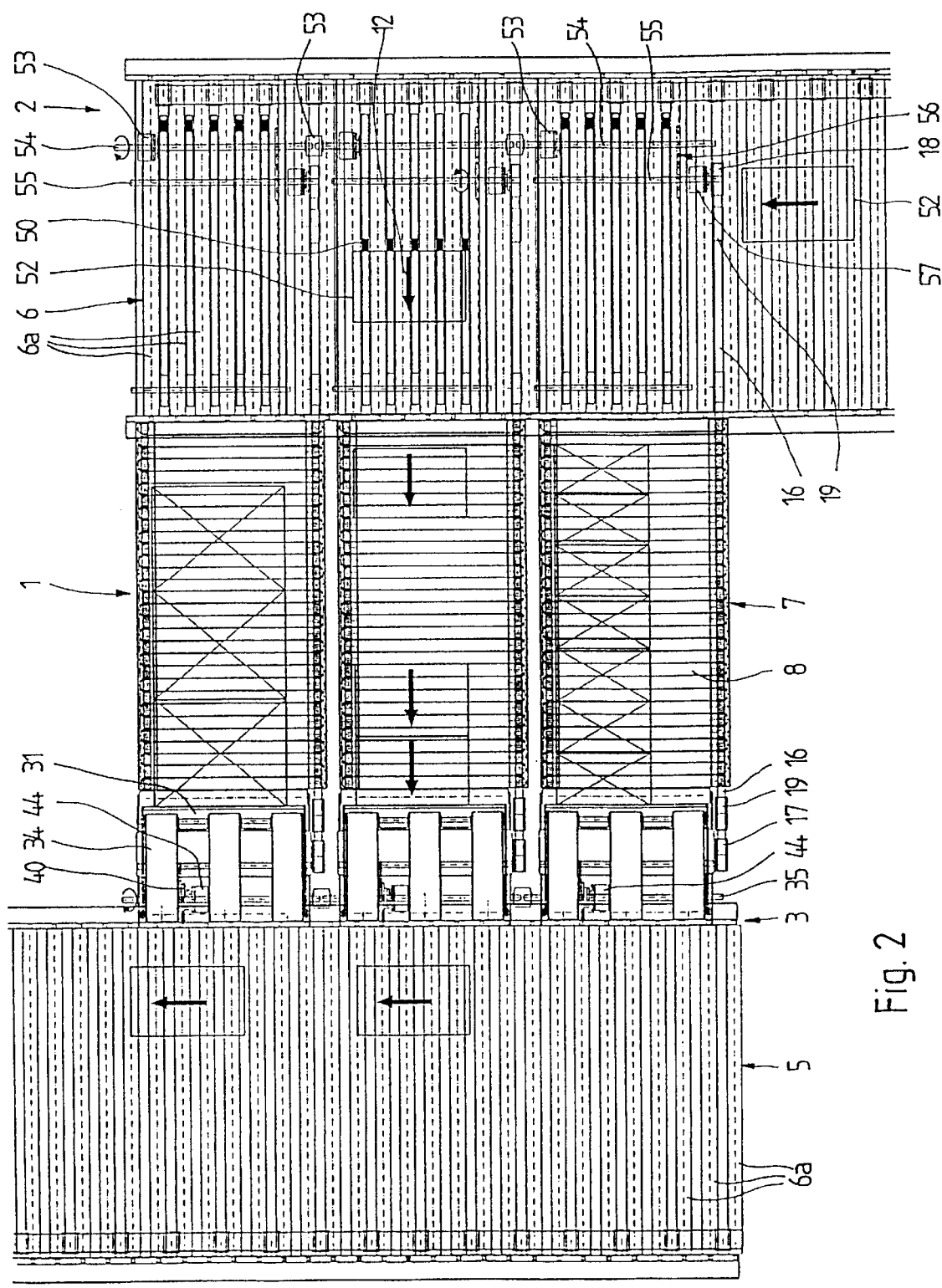

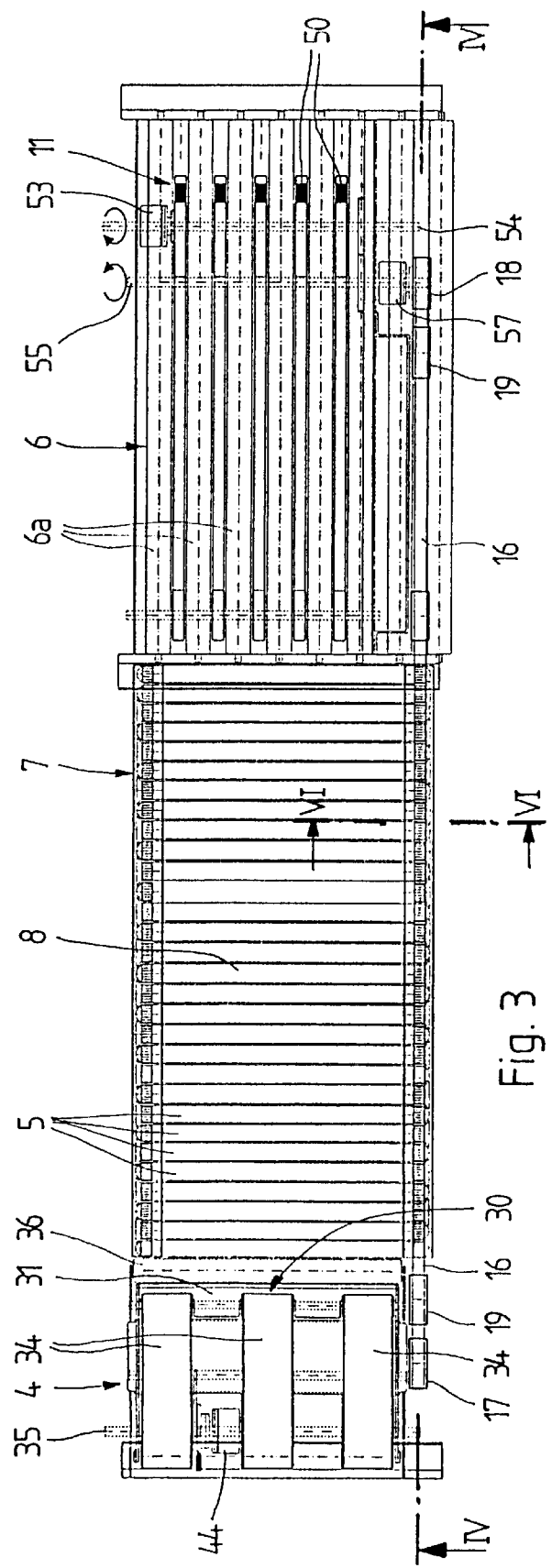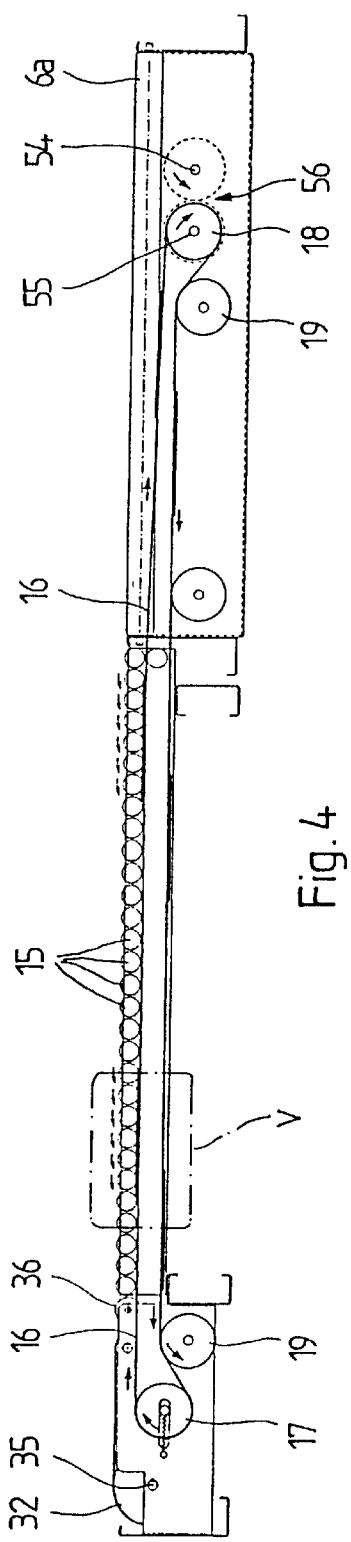

OUT-PROCESSING FACILITY FOR INDIVIDUAL GOODS

BACKGROUND OF THE INVENTION

The invention relates to an out-processing facility for individual goods, comprising:
  a storage or support area with a plurality of storage or support passages for items to be out-processed extending parallel to one another therein, whereby only items of the same type are located in each passage;
  a loading area at one end of the storage passages with means for in-loading new items into the storage passages provided therefor; and
  an out-processing area at the other end of the storage passages with removal devices for computer-controlled transfer of individual items out of the storage passages onto downstream conveyor devices.

Warehouse order-processing technology is gaining importance in all fields of commerce and in particular in the wholesale foods industry. However, warehousing in its narrower sense (i.e., static storage of individual goods) is becoming less significant while the dynamic processes and especially turn-around handling of goods is gaining importance. The goal of modern warehousing is therefore to keep the retention time of the individual goods in the warehouse to a minimum and thus to keep to a minimum the amount of capital tied up in warehousing.

Known out-processing facilities are multi-story racks that have storage passages for the individual goods and that are arranged adjacent to and above one another. The floors of the passages are provided with roller conveyors made of freely rotatable rollers and are slightly inclined so that goods warehoused at the one end of the passage, the so-called stocking or loading side, move along the roller conveyors to the other end of the passage, the removal or order processing side. Placing the individual goods into position on the stocking side is generally done manually in that the individual goods are removed from a pallet and placed into the assigned passage. Order-processing at the removal side of the racks is also frequently performed manually.

However, also known are computer-controlled drivable removal devices in the form of conveyor devices that can be driven in a passage arranged on the order-processing side of the rack and that, corresponding to the order, take the individual goods maintained instock in the individual passages and assemble the order. The conveyor devices used for this can be driven over corresponding guides in two coordinates so that each conveyor device can access individually each of the passages arranged adjacent to and above one another.

The object of the invention is to provide an out-processing facility with which high turn-around rates can be achieved and which is also suitable for simultaneous processing of goods that are very different in terms of weight and size.

SUMMARY OF THE INVENTION

For achieving this object in an out-processing facility of the type described in the foregoing, it is proposed that every passage comprise a roller conveyor, the rollers or cylinders of which can be set in motion via a common drive means, and that each passage be provided with a discrete removal apparatus that is actuatable independent of the other removal apparatus.

Such an out-processing facility makes it possible to achieve a higher turn-around rate than is the case in conventional systems because each individual passage is provided with a discrete removal apparatus that is actuatable independent of the other removal apparatus in the out-processing facility. This means that the inventive out-processing facility makes possible a turn-around rate at which it would even be possible, at full capacity, to remove items from all of the passages and assemble an order simultaneously. The items can even also be very different individual goods in terms of their weight and size. The use of a roller conveyor for each passage, the rollers or cylinders of which can be set in motion via a common drive means, ensures that light and heavy, large and small individual goods and containers are transported and stocked in the passages with the same degree of assurance. Even individual goods that are critical in conventional warehouse engineering, such as, for instance, full plastic crates of beverages, can be processed with no problem using the driven roller conveyor.

In accordance with one preferred embodiment of the out-processing facility, the common drive means is a continuous drive belt, and the drive belt has a first and a second group of longitudinal segments, whereby the longitudinal segments of each group alternate, the longitudinal segments of the first group exert a friction and/or positive driving torque on the rollers or cylinders, and the longitudinal segments of the second group exert no driving torque or comparatively less driving torque on the rollers or cylinders. Such a drive belt with longitudinal segments that work at different strengths leads to reduced conveyor pressure on the roller conveyor so that above all only limited pressure is exerted on the individual goods arranged at the first position on the removal-side end of the passage. This is advantageous precisely in the case of goods or containers that are sensitive to shock or pressure. It is furthermore advantageous that the removal apparatus of the out-processing area can be operated with limited drive power due to the limited dynamic pressure.

The drive belt preferably comprises a continuous base body, which has the same thickness over its entire length, and drive segments that are affixed by segment to the base body and that form the longitudinal segments of the first group. For achieving a slip-free form-fit, it is furthermore advantageous when the drive segments have teeth on their exterior side and the teeth thus formed engage with corresponding opposing teeth on the circumference of the rollers or cylinders of the roller conveyor.

For achieving sufficient constructive freedom in the design of the drive and reversing devices for the drive means of the roller conveyor, it is furthermore suggested that the drive belt be reversed via reversing rollers that are situated in or below the loading area and/or the out-processing area.

For achieving limited drive slip while maintaining a cost-effective design of the roller conveyor, it is furthermore suggested that the drive belt be conducted between the rollers or cylinders and a pressure counter bearing, and that the pressure counter bearing be a longitudinally extending profile that is connected to a roller conveyor profile on which the individual rollers or cylinders are borne.

One preferred embodiment of the out-processing facility is characterized in that a transport conveyor that is preferably continuously driven extends along the removal apparatus and transverse to the passages for the items removed using the removal apparatus, and in that components of each removal apparatus are an actuatable retaining element projecting into the conveyor path of the roller conveyor and a horizontal conveyor that is arranged after the retaining element in the direction of *p+11Xconveyance and whose conveyor speed is greater than the conveyor speed of the roller conveyor. Preferably the conveyor speed of the horizontal conveyor is at least 25% greater than the conveyor speed of the roller conveyor. This achieves assured and problem-free separation of the first items to be removed from the items arranged thereafter and being conveyed by means of the drive device of the roller conveyor.

For achieving a constructively simple design of the out-processing area, it is furthermore suggested that a plurality of horizontal conveyors be driven via a common drive shaft that extends transversely to the passages. Furthermore suggested is a controlled switchable coupling for time-delimited initiation of an unblocking motion by the retaining element that releases the conveyor path from the rotational movement of the common drive shaft, whereby the coupling of each removal apparatus can be triggered separately from the other couplings. In contrast to the unblocking motion, it is not necessary to use the motor drives present for the subsequent re-blocking motion of the retaining element. Rather, it is sufficient when the retaining element is provided with restoring means that act upon the retaining element with a restoring force in the direction of its blocking motion, whereby the restoring force is less than the weight of the items/containers stored in the passage. This restoring force can be produced, for instance, by the weight or force of a suitable restoring spring.

In terms of the coupling, this is preferably a magnetic coupling annularly enclosing the common drive shaft, the output member of which is a cam that pivots against the restoring element when the magnetic coupling is triggered.

With the goal of a compact design for the out-processing area, it is suggested that the horizontal comprises a first, non-rotating belt pulley that is coaxially connected to the drive shaft, at least one additional belt pulley that runs therewith, and a continuous belt conducted via the belt pulleys, whereby the driven belt pulley defines the forward end and the belt pulley that runs therewith defines the rear end of the horizontal conveyor.

One embodiment of the loading area of the inventive out-processing facility is characterized by a transport conveyor for new items to be in-loaded that extends transversely to the passages and constitutes individual transport cylinders, whereby transverse conveyors that are separately actuatable for each said passage are arranged between the transport cylinders in the direction of that passage. The transverse conveyor preferably comprises belt pulleys over which is conducted a continuous drive belt on the exterior side of which are attached catch elements, which, when they are located on the carrying run of the drive belt, project beyond the conveyor surface of the transport cylinders. Transport means of the transverse conveyor are therefore not the belts themselves, but rather the catch elements attached thereto. Their interval on the drive belt is preferably greater than the length of the carrying run. This ensures that the catch elements do not impede the movement of the individual goods along the transport cylinders that comprise the transport conveyor.

In one additional embodiment of the out-processing facility it is suggested that the drive of a plurality of transverse conveyors occurs via a common main drive shaft and that each transverse conveyor has a discrete coupling for initiating its movement from the rotational movement of the main drive shaft, whereby the coupling of each transverse conveyor can be triggered separately from the other couplings. A magnetic coupling is preferably employed in this case, as well. For the purpose of structural simplification, it is finally suggested that the movement of the common drive means of the roller conveyor also be initiated by the rotational movement of the main drive shaft, preferably via a reverse gear and a coupling, preferably magnetic, that can be triggered individually for each roller conveyor. In this manner the number of drive components, such as electromotors, is reduced to a minimum. Compared to a separate electrical drive, current consumption by the electrical magnetic couplings is very low; they are only triggered for short periods, in contrast to the main drive shaft, which can be operated continuously.

BRIEF DESCRIPTION OF THE DRAWINGS

The following explains an inventive out-processing facility using an exemplary embodiment and with reference to the drawings.

In the drawings:

FIG. 2 is an enlarged top view of a part of an out-processing facility, whereby for reasons of simplification the storage area is shown much abbreviated;

FIG. 3 is a detailed drawing of a storage or support passage corresponding approximately to FIG. 2 with associated loading area and an associated removal apparatus;

FIG. 4 is a cross-section in accordance with the line IV—IV in FIG. 3;

DESCRIPTION OF PREFERRED EMBODIMENTS

Figure 1:
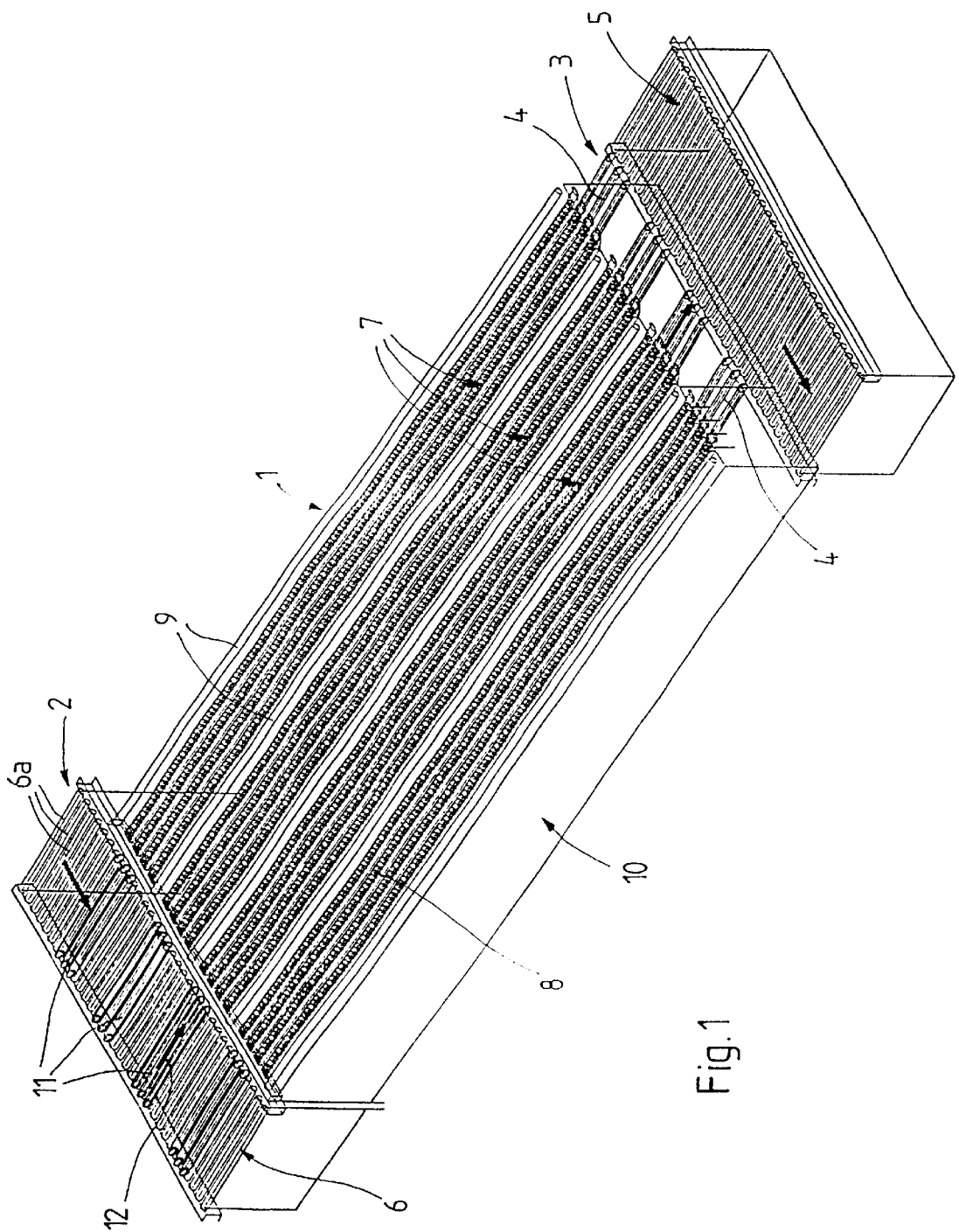
FIG. 1 is a perspective illustration of a section of an out-processing facility comprising a loading area, a storage area, and an order-processing area.

The out-processing facility for individual goods, including full cases of beverages and containers for grocery items that have a high turn-around rate in commercial trade, essentially comprises a storage area 1, a loading area 2 upstream of the storage area 1, and an out-processing area 3 downstream of the storage area 1. New individual goods that are to be in-loaded are in-loaded in the loading area 2 in the correct storage site inside the storage area 1. In the out-processing area 3, the individual goods corresponding to the order are removed, computer-controlled, from the storage area 1 and conveyed to a location at which the orders are then assembled and if needed packed in larger packages. Provided for removing the individual goods from the storage area 1 are removal apparatus 4 that place items removed individually from the storage area 1 onto a downstream transport conveyor 5 along which the items are then further transported.

The items are also supplied to the loading area 2 by means of a continuously-driven transport conveyor 6, which, like the transport conveyor 5 of the out-processing area 3, comprises a plurality of driven transport cylinders 6a upon which the transported individual goods roll.

The storage area 1 constitutes a plurality of support passages 7 that are arranged horizontally at uniform height and parallel to one another. The passages 7 comprise roller conveyors 8 made of rollers or cylinders that are borne in profiles on either side. Limits 9 separate the individual passages 7 from one another so that goods cannot inadvertently travel into adjacent passages. In the framework of the embodiments explained in more detail in the following, the function of the limits 9, that is, lateral guidance of the goods, can also be realized by flanges on the rollers or cylinders.

Only items or goods of the same type are located in each passage 7 in the out-processing facility. It is therefore possible to store four different types of items in the storage area 1 illustrated in FIG. 1, which comprises a total of four passages. Items of the same type are arranged one behind the other in each passage 7, whereby they move up to the end of the passage 7 facing the out-processing area 3 as a result of the drive of the roller conveyor, described in greater detail in the following, and the forward-most item is held there at a retaining element.

The total of four passages 7 illustrated in FIG. 1 together form a module 10. A plurality of such modules can be arranged adjacent to one another so that, depending on physical parameters, up to 100 passages can be arranged adjacent to one another and with common devices in the loading area 2 and the out-processing area 3. In addition, the illustrated out-processing area can be arranged in several layers in order to increase space utilization.

The transport conveyor 6 is common to all passages 7, which is why even items of different types can be conveyed using the transport conveyor 6. In order to categorize each of these items into the correct passage 7, each passage has a discrete transverse conveyor 11 with a direction of conveyance 12 in the direction of the passage. Each transverse conveyor 11 is controlled fully automatically as a function of the group of items supplied via the transport conveyor 6. These can be identified, for instance, using a barcode located on the individual goods.

From the basic illustration of FIG. 1, it cannot be seen that a second out-processing area can be disposed on the other side of the transport conveyor 6 that faces away from the passages 7 so that outlet processing areas on both sides can be loaded via the transport conveyor 6. Naturally in this case the transverse conveyors 11 should be able to transport in both directions.

In the out-processing area 3, the items are removed individually from the passages 7 by means of the removal apparatus 4 and are transferred to the common transport conveyor 5, which extends transverse to the passages. Each individual passage 7 is allocated a discrete removal apparatus 4, which is why items can be removed from several passages 7 at once and transferred to the transport conveyor 5, which is designed to be wide enough for this purpose.

Details and the functioning of the roller conveyors 8 of the storage area are described in the following using FIGS. 2 through 6.

The cylinders 15 of each roller conveyor can be caused to rotate via a drive means that is common to all of the cylinders in the roller conveyor. This common drive means is a continuous drive belt 16 that is guided via reversing rollers 17, 18. The reversing roller 17 is located below the out-processing area 3, and the reversing roller 18 is located below the loading area 2 of the out-processing facility. Provided in addition are suitable tension rollers 19 that produce the tensioning pressure on the drive belt that is required for properly transporting the drive belt 16. This tension can also be produced directly via the reversing roller 17 and 18, however.

Figure 5:
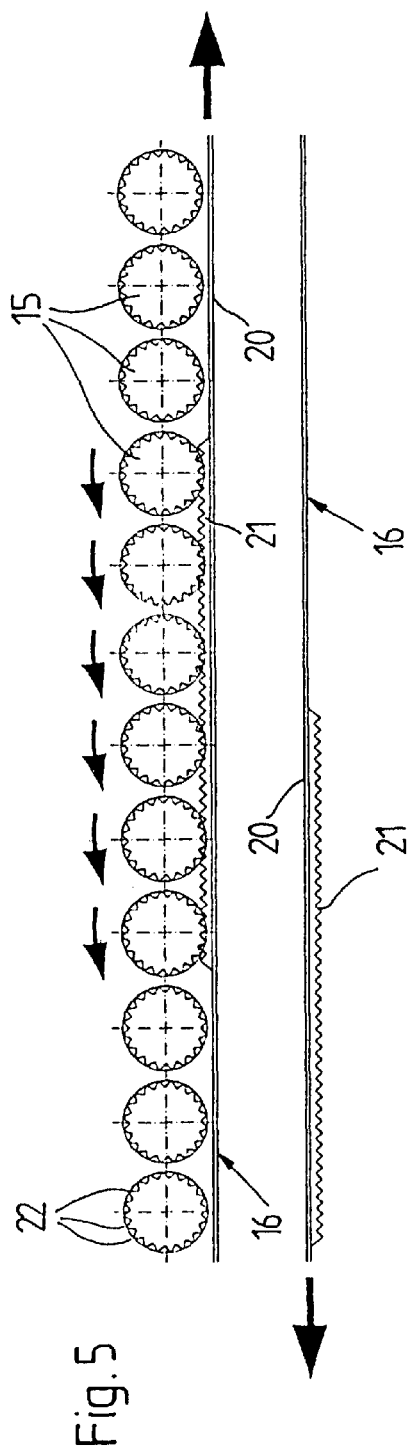
FIG. 5 is an enlargement of detail V in FIG. 4.
Figure 6:
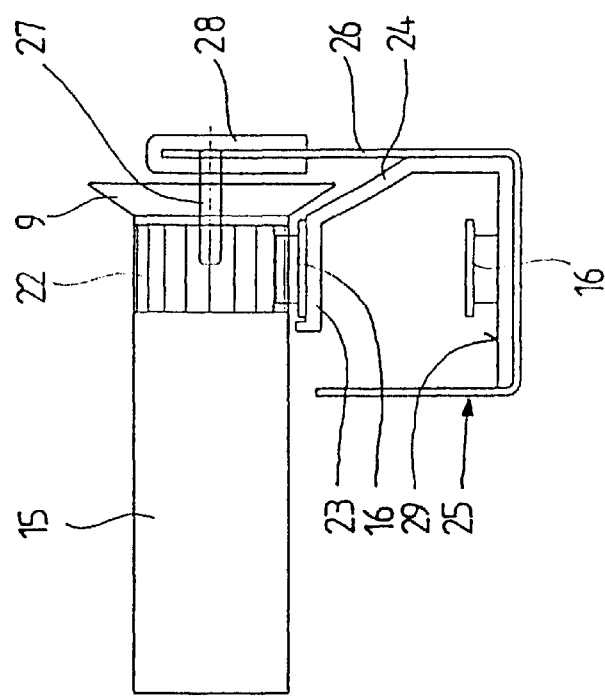
FIG. 6 is a partial cross-section along the line VI—VI in FIG. 3.

FIGS. 5 and 6 illustrate how the drive belt 16 effects the drive of the individual cylinders 15 in the roller conveyor. The drive belt 16 comprises a continuous base body 20, which has the same thickness across its entire length and drive segments 21 in the form of toothed bands affixed by segment to the base body 20. However, the drive segments 21 cover only a portion of the length of the drive belt 16 so that there are additional segments between each drive segment 21 that do not have any teeth. Both groups, that is, the segments of the drive belt 16 provided with the drive segments 21 and the segments of the drive belt comprising only the base body 20, alternate, whereby the intervals between successive drive segments 21 are preferably the same.

The ends of the cylinders 15 are provided with opposing teeth 22 that engage with the teeth of the drive segments 21. In this manner a cylinder 15 is only driven if one of the drive segments 21 is directly beneath it. In contrast, a cylinder 15 is not driven if directly beneath it there is only the base body 20 of the drive belt 16.

To ensure that the drive belt 16 in the region of its drive segments 21 engages securely with the opposing teeth 22 of the cylinders 15, the resultant reaction force must be absorbed. A pressure counter bearing 23 is used for this; it extends across the entire length of the roller conveyor 8 in the form of a continuous surface. The upper or carrying run of the drive belt 16 is thus pulled between the pressure counter bearing 23 and the individual cylinders 15. The interval is designed such that the drive segments 21 of the drive belt 16 can be pulled through this gap with no play so that the teeth and opposing teeth 22 truly engage. The pressure counter bearing is formed by the flat top side of a profile 24 that is inserted in a roller conveyor profile 25. An exterior leg 26 of the roller conveyor profile 25 supports the individual rollers or cylinders 15. The rollers or cylinders 15 are provided with short spindles 27 that are attached to the exterior leg 26 of the roller conveyor profile 25 via clips 28 that can be clipped on. The clips 28 make it possible to exchange individual cylinders for other cylinders rapidly and easily. During return transport, the bottom run of the drive belt 16 runs inside the roller conveyor profile 25, preferably on. the smooth upper side 29 of the profile 24, as seen in FIG. 6.

Details and functioning of the removal apparatus 4 are explained in the following using FIG. 7.

Each removal apparatus 4 comprises a horizontal conveyor 30 and a retaining element 31. The horizontal conveyor 30, the conveying level of which is the same as the conveying level of the roller conveyor 8, comprises two belt pulleys 32, 33 that guide a wide belt 34. Each horizontal conveyor 30 comprises a total of three of these belts 34. The belt pulley 32, which is farther away from the roller conveyor 8, is driven and for this purpose is seated directly on a drive shaft 35. The drive shaft 35 is continuously driven and simultaneously drives the horizontal conveyors 30 of a plurality of passages. All of the horizontal conveyors 30 therefore run continuously. In contrast to the belt pulley 32, the other belt pulley 33 of the horizontal conveyor 30 is not driven. The belt pulley 33 is located in the closest possible proximity to the roller conveyor 8. In the exemplary embodiment it is located between the belt pulley 33 and a smaller, free-running roller 36 adjacent to the next cylinder 15 of the roller conveyor.

Another component of the retaining element 31 of the removal apparatus 4 is furthermore a lever 37, at the end of which is located the blocking member of the retaining element. The lever 37 is borne on a horizontal axis 38. The retaining element 31 can be pivoted back and forth about the axis 38 between two positions. In the first position, illustrated at the top of FIG. 7, the blocking member of the retaining element 31 projects into the conveyance path for the items 39. In its other position, the retaining element 31 drops to the conveying level or below. The second and third stages illustrated in FIG. 7 show the retaining element 31 in this position.

Provided in order to move the retaining element 31 out of its blocking position into its unblocking position is a cam 40 that is borne on an axis that is coaxial with the drive shaft 35. The cam 40 has a surface 41 that runs along a roller 42, whereby the roller 42 is located on the lever 37. In the exemplary embodiment, the lever 37 is a two-armed lever, whereby the blocking member is located at the end of one arm of the blocking member, while the roller 42 is borne on the length of the other arm.

Figure 7:
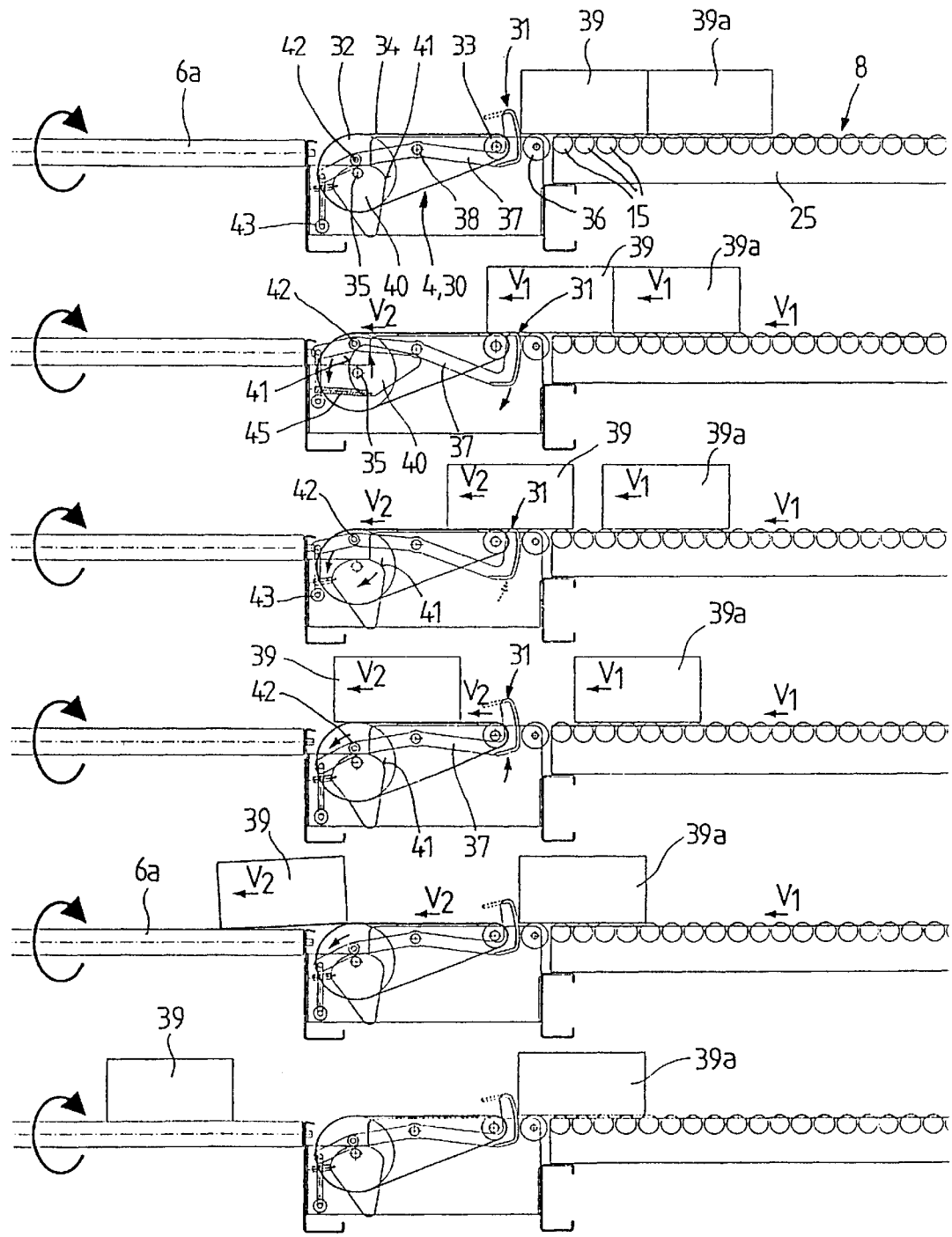
FIG. 7 are details of the removal of items on the out-processing side of the out-processing facility in six steps.

If the cam 40 is rotated approximately 900, as can be seen in the second stage of FIG. 7 compared to the first stage in the figure, the interaction of the surface 41 with the roller 42 causes the lever 37 to move, the retaining element 31 dropping below the conveying level of the roller conveyor. At this point in time, the first item 39 is no longer retained by the retaining element 31 and therefore rolls, driven by the roller conveyor, onto the horizontal conveyor 30. As soon as the bottom side of the first item 39 comes into contact with the belt 34 of the horizontal conveyor 30, the item 39 immediately assumes the speed of the horizontal conveyor 30. Depending on the weight of the item, this speed is at least 25% higher than the speed of the roller conveyor 8. Due to this higher speed on the horizontal conveyor 30, the first item 39 is separated from the subsequent item 39a. FIG. 7 illustrates this with the different speeds $V_2$ and $V_1$, $V_2$ being greater than $V_1$.

In the third stage in accordance with FIG. 7, the item 39, conveyed with its weight virtually exclusively by the horizontal conveyor 30, via the speed thereof, rolls over the retaining element 31. At this point in time, the cam 40 has dropped again due to a time control. In addition, the retaining element 31 remains in its lowered position, since its restoring force is less than the weight of the item 39. The aforesaid restoring force is produced by a counterweight 43 that is suspended on the second arm of the lever 37. The lever 37 of the retaining element cannot pivot upward again due to the counterweight 43 until the bottom side of the item 39 has passed over the retaining element 31, as illustrated in the fourth stage of FIG. 7. The conveyor is immediately blocked again so that the subsequent item 39a is stopped at the retaining element 31. Then the next removal procedure can be initiated, whereby the method repeats. The item 39 conveyed off by the horizontal conveyor 30 travels onto the transport cylinders 6a of the continuously driven transport conveyor 5.

The cam 40 is driven by the continuous rotation of the drive shaft 35. Seated on the drive shaft 35 is an electrical magnetic coupling 44, the drive member of which is the cam 40. Thus it is only during the time-delimited excitation of the magnetic coupling 44 that the cam 40 is actuated and the retaining element 31 thus unblocks. The drive force to be applied for this is relatively low, which is why a small magnetic coupling on the drive shaft 35 is sufficient for driving the cam 40. A tension spring 45 draws the cam 40 back to its rest position.

The detail and functioning of the transverse conveyor 11 in the loading area 2 of the out-processing area are explained in the following using FIG. 8. Located in front of each passage is a discrete transverse conveyor 11. The transverse conveyor 11 works, as was explained in the foregoing for the out-processing area, using a continuous belt 46 that is conducted over belt pulleys 47, 48. Belt 46 and belt pulleys 47, 48 are provided with mutually engaging teeth for preventing slip. A chain can also be employed instead of the belt 46, and pinions instead of the belt pulleys 47, 48.

The upper or carrying run 49 of the belt 46 is located somewhat lower than the top side of the transport cylinders 6a. Belt 46 and belt pulleys 47, 48 are relatively narrow so that they fit between two successive transport cylinders 6a in the transport conveyor 6. Arranged on the exterior side of each continuous belt 46 are catch elements 50 that can circulate together with the belt 46. When they are on the carrying run of the drive belt 46, the catch elements 50 project higher than the conveying surface 51 of the transport conveyor 6.

Figure 8:
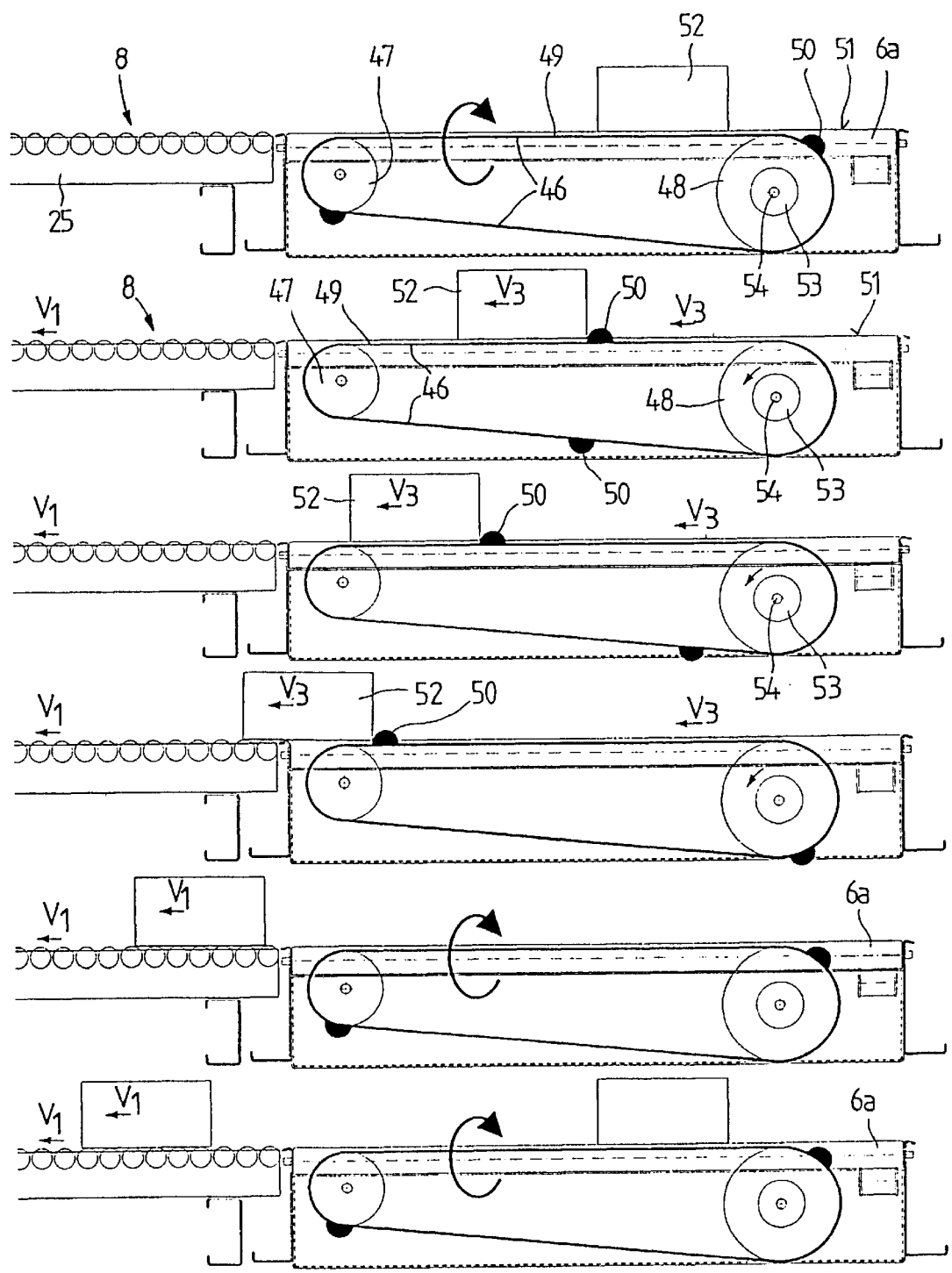
FIG. 8 are details of loading the passage in the loading area of the out-processing facility in six steps.

As can be seen in the uppermost illustration in FIG. 8, the interval between catch elements 50 is somewhat greater than the length of the carrying run 49. In this manner, neither of the two catch elements 50 projects over the conveying surface 51, and thus into the conveying path of the transport conveyor, in the uppermost stage illustrated in FIG. 8. It is not until the transverse conveyor 11 has been turned on that the exterior of the two catch elements 50 moves up and grips the item 52 so that it is pushed along the transport rollers 6a into the passage 7. A total of two catch elements 50 are provided In the exemplary embodiment, but their number can also be lower or higher, depending on the width of the transport conveyor 6.

The transport belts 46 of the transverse conveyor 11 are also driven using magnetic couplings 53. The magnetic couplings 53 are seated on a main drive shaft 54 that is common to all of the transverse conveyors 11 and that can be controlled separately for each passage. When current is flowing, the magnetic couplings 53 produce a momentary connection between the belt pulley 48 and the main drive shaft 54, the drive belt 46 thus being caused to operate for as long as current flows in the magnetic coupling 53.

As can be seen in particular from FIG. 2, the main drive shaft 54 causes not only all of the transverse conveyors 11 to move, but it also drives the roller conveyor 8. An additional shaft 55 extends parallel to the main drive shaft 54, whereby the additional shaft 55 is driven by means of a reversing gear 56 by the main drive shaft 54. The reversing gear 56 comprises two opposing toothed wheels that are seated on the main drive shaft 54 or shaft 55 secure against torque. The reversing roller 18 is seated on the shaft 55 via an additional magnetic coupling 57 and is the drive roller for the drive belt 16. Thus, while the shaft 55 runs continuously driven by the main drive shaft, torque is only transferred to the reversing roller 18 when the magnetic coupling 57 is actuated. In this manner it is possible, controlled by the magnetic coupling 57, to drive the roller conveyor 8 only as needed. This is the case when new items are to be in-loaded into the passages in the loading area 2, or when an item is to be removed from this passage in the out-processing area. Otherwise the roller conveyor for this passage can rest due to the non-actuation of the magnetic coupling 57, so that the item there is not subjected to unnecessary friction.

Finally, as can be seen from FIG. 2, each transverse conveyor 11 comprises a plurality of transport belts 46, four transport belts each in the exemplary embodiment. This achieves better and quieter transverse transport of the items 52 into the passages. The transport cylinders 6a of the transport conveyor 6 stand still during this transverse transport.

It is obvious that the out-processing facility described is program-controlled. Despite its complexity, the expense for the controls is relatively low since the great majority of processes can be controlled by turning on and off the magnetic couplings 44, 53, 57, which require practically no maintenance.

"The specification incorporates by reference the disclosure of European priority document PCT/EP99/08823 of Nov. 17, 1999.

The present invention is, of course, in no way restricted to the specific disclosure of the specification and drawings, but also encompasses any modifications within the scope of the appended claims."

Legend
1 Storage area
2 Loading area
3 Out-processing area
4 Removal apparatus
5 Transport conveyor
6 Transport conveyor
6a Transport cylinder
7 Storage passage
8 Roller conveyor
9 Limit, flange
10 Module
11 Transverse conveyor
12 Direction of conveyance
15 Cylinder
16 Drive belt
17 Reversing roller
18 Reversing roller
19 Tension roller
20 Base body
21 Drive segment
22 Opposing teeth
23 Pressure Counter Bearing
24 Profile
25 Roller conveyor profile
26 Leg
27 Spindle
28 Clip
29 Carrying run
30 Horizontal conveyor
31 Retaining element
32 Belt pulley
33 Belt pulley
34 Belt
35 Drive shaft
36 Roller
37 Lever
38 Axis
39 Item to be removed
39a Subsequent item
40 Cam
41 Cam surface
42 Roller
43 Counterweight
44 Magnetic coupling
45 Tension spring
46 Transport belt
50 Catch element
47 Belt pulley
48 Belt pulley
49 Carrying run
51 Conveyor surface
52 Item
53 Magnetic coupling
54 Main drive shaft
55 Shaft
56 Reversing gear
57 Magnetic coupling

What is claimed is:

1. An out-processing facility for individual goods, comprising:
   a support area having a plurality of parallel support passages for items to be out-processed, wherein said passages comprise roller conveyors, and wherein each passage is provided for successive items of the same type;
   a common drive means for rotating rollers or cylinders of said roller conveyors;
   a loading area disposed at a first end of said passages, wherein said loading area is provided with means for in-loading new items into said passages; and
   an out-processing area at an end of said passages remote from said loading area, wherein said out-processing area is provided with a plurality of removal devices for a computer-controlled transfer of individual items from said passages onto downstream conveyor mechanisms, wherein a respective removal device is provided for each of said passages, wherein each removal device is operable independent of the other removal devices, wherein each removal device includes an actuatable retaining element that projects into a conveying path of said roller conveyor and serves for retaining successive items in a given passage, wherein each removal device also includes a horizontal conveyor disposed downstream of said retaining element, and wherein a conveying speed of said horizontal conveyor is greater than a conveying speed of said driven roller conveyor.

2. An out-processing facility according to claim 1, wherein said common drive means is an endless drive belt that has a first group and a second group of longitudinal segments, wherein said longitudinal segments respectively alternate with one another, wherein longitudinal segments of said first group exert a positive driving torque on said rollers or cylinders of said roller conveyor, and wherein said longitudinal segments of said second group exert at most a slight driving torque on said rollers or cylinders.

3. An out-processing facility according to claim 2, wherein said drive belt comprises a continuous base body that has the same thickness over its entire length, and also comprises drive segments that are secured in sections to said base body and form said longitudinal segments of said first group.

4. An out-processing facility according to claim 3, wherein said drive segments have teeth on an outer side thereof that engage corresponding opposing teeth on a periphery of said rollers or cylinders of said roller conveyor.

5. An out-processing facility according to claim 2, wherein said drive belt is guided over reversing rollers that are disposed in or below at least one of said loading area and said out-processing area.

6. An out-processing facility according to claim 2, wherein said drive belt is guided between said rollers or cylinders of said roller conveyor and a pressure counter bearing, and wherein said pressure counter bearing is an elongated profiled member that is connected to a profiled roller conveyor member on which individual ones of said rollers or cylinders are supported.

7. An out-processing facility according to claim 1, wherein a preferably continuously driven transport conveyor, which is provided for items removed with the aid of said removal devices, extends along said removable devices and transverse to said support passages.

8. An out-processing facility according to claim 1, wherein a conveying speed of said horizontal conveyor is at least 25% greater than a conveying speed of said roller conveyor.

9. An out-processing facility according to claim 1, wherein a common drive shaft is provided for driving a plurality of said horizontal conveyors, and wherein said drive shaft extends transverse to said support passages.

10. An out-processing facility according to claim 9, wherein a controlled switchable coupling is provided for a time-delimited initiation, from the rotational movement of said common drive shaft, of an unblocking motion of said retaining element for releasing said conveyor path, wherein said coupling of each removal apparatus is adapted to be activated separately from the other couplings.

11. An out-processing facility according to claim 10, wherein said retaining element is provided with restoring means that acts upon said retaining element with a restoring force in the direction of its blocking motion, wherein said restoring force is less than a weight of items located in said support passage.

12. An out-processing facility according to claim 10, wherein said coupling is a magnetic coupling that annularly surrounds said common drive shaft, and wherein said magnetic coupling has an output member in the form of a cam that pivots against said retaining element when said magnetic coupling is activated.

13. An out-processing facility according to claim 9, wherein said horizontal conveyor comprises a first belt pulley that is coaxially and fixedly connected to said drive shaft, at least one additional belt pulley that rotates therewith, and an endless belt that is guided over said belt pulleys, and wherein said driven first belt pulley defines a forward end, and said at least one additional belt pulley defines a rear end, of said horizontal conveyor.

14. An out-processing facility according to claim 1, wherein a transport conveyor for new items to be in-loaded extends in said loading area transverse to said support passages and is comprised of individual transport cylinders, wherein transverse conveyors that are separately actuatable for each support passage are disposed between said transport cylinders and have a conveying direction in a direction toward a respective passage.

15. An out-processing facility according to claim 14, wherein each of said transverse conveyors comprises belt pulleys over which is guided an endless drive belt, on an outer side of which are secured catch elements that, when they are disposed on an upper run of said drive belt, project beyond a conveyor surface of said transport cylinders.

16. An out-processing facility according to claim 15, wherein an interval between said catch elements on said drive belt is greater than a length of said upper run of said drive belt.

17. An out-processing facility according to claim 14, wherein a common main drive shaft is provided for driving a plurality of said transverse conveyors, wherein each of said transverse conveyors has its own coupling for deriving its movement from a rotational movement of said main drive shaft, and wherein said coupling of each of said transverse conveyors can be activated separately from said other couplings.

18. An out-processing facility according to claim 17, wherein movement of said common drive means of said roller conveyor is also derived from said rotational movement of said main drive shaft.

19. An out-processing facility according to claim 18, wherein said movement of said common drive means of said roller conveyor is derived via a reversing gear and a coupling that can be activated individually for each roller conveyor.

* * * * *